United States Patent [19]
Kelly et al.

[11] Patent Number: 5,121,071
[45] Date of Patent: Jun. 9, 1992

[54] LOCK DETECTOR FOR UNBALANCED QPSK DEMODULATORS

[75] Inventors: Lawrence R. Kelly; Geoffrey S. Waugh, both of Palo Alto, Calif.

[73] Assignee: Loral Aerospace Corp., New York, N.Y.

[21] Appl. No.: 738,468

[22] Filed: Jul. 31, 1991

[51] Int. Cl.$^5$ ............................................. H04L 27/00
[52] U.S. Cl. ........................................ 329/307; 331/4; 331/DIG. 2; 375/81; 375/120
[58] Field of Search ...................... 329/304, 306, 307; 331/4, DIG. 2; 375/81, 83, 120

[56] References Cited

U.S. PATENT DOCUMENTS

| | | | |
|---|---|---|---|
| 4,092,606 | 5/1978 | Ryan | 329/308 |
| 4,713,630 | 12/1987 | Matthews | 331/4 |
| 4,860,321 | 8/1989 | von der Embse | 375/96 |
| 4,870,382 | 9/1989 | Keate et al. | 331/4 |

Primary Examiner—Robert J. Pascal
Attorney, Agent, or Firm—Francis H. Lewis; Edward J. Radlo

[57] ABSTRACT

A lock detector circuit (60) for demodulators of UQPSK signals I and Q has signal processing circuits for forming the signals:

$$A = 6I^2Q^2 - I^4 - Q^4;$$

$$B = 4(I^2 - Q^2).$$

A switch (19) is provided for coupling either signal A or signal B to the output (20) of the detector circuit, depending on the value of the signal ratio Q/I. In an alternative embodiment, a summing circuit adds signal A and signal B, and directs the sum to the detector output (20). The resulting output signal is constant under lock conditions, and oscillates when the demodulator is unlocked. This output signal is directed through a comparator (49) to the sweep circuit (43) controlling demodulator VCO (42), and causes the demodulator to remain in the locked condition. The lock detector circuit is effective for any value of Q/I, and utilizes only three analog multiplier circuits.

9 Claims, 3 Drawing Sheets

LOCK DETECTOR FOR UNBALANCED QPSK DEMODULATORS

STATEMENT AS TO RIGHTS TO INVENTIONS MADE UNDER FEDERALLY-SPONSORED RESEARCH AND DEVELOPMENT.

This is a subject invention made with U.S. Government support under Subcontract No. F14000-J19513. The Government has certain rights in this invention.

BACKGROUND OF THE INVENTION

This invention pertains generally to the field of lock detectors for receivers of phase shift keyed (PSK) signals used in high frequency electronic data communication systems, and more particularly, to lock detectors utilized in demodulators of quadriphase shift keyed (QPSK) signals.

Phase shift keyed systems have been widely used for high frequency transmission of binary data signals, partly because of their advantages in terms of bandwidth and power efficiency for data transmission. In the ordinary binary phase shift keyed (BPSK) system, a carrier wave at frequency $f_0$ is modulated by a signal $u(t)$ which is a function of time t, representing a stream of binary data, where $u(t) = +1$ for a bit value 1, and $u(t) = -1$ for a bit value 0. The resulting modulated signal amplitude is given by the expression:

$$S(t) = (2P)^{\frac{1}{2}} u(t) \sin(\omega_0 t), \quad (1)$$

where $\omega_0 = 2\pi f_0$ is the carrier frequency in radians per second, and P is the transmitted power.

The quadriphase shift keyed (QPSK) system is an improvement over the BPSK system in terms of bandwidth and power efficiency. In the QPSK system two independent data streams are transmitted over the same carrier wave. We can represent these data signals by $u_I(t)$ and $u_Q(t)$ where I and Q stand for "inphase" and "quadriphase" signal channels, and $u_I$ and $u_Q$ take values of either +1 or -1. The modulated signal amplitude is then given by the expression:

$$S(t) = (P/2)^{\frac{1}{2}} [u_I(t) \sin(\omega_0 t) + u_Q(t) \cos(\omega_0 t)] \quad (2)$$

The QPSK transmission scheme described by this expression is a balanced QPSK, in that both the inphase and quadriphase channels have equal amplitude and hence equal power. In cases where the data rate in one channel is lower than in the other channel, it is desirable to attenuate the signal in the channel having a lower data rate. This will provide more power in the channel having a higher data rate, and result in an overall improved bit error rate (BER) for the combined signal. In the unbalanced QPSK (UPQSK) scheme, the modulated signal amplitude is given by the expression:

$$S(t) = (P/2)^{\frac{1}{2}} [bu_I(t) \sin(\omega_0 t) + au_Q(t) \cos(\omega_0 t)] \quad (3)$$

where a/b is the ratio of the signal in the Q channel to that in the I channel, and $a^2 + b^2 = 1$. Thus, if the Q channel is attenuated relative to the I channel, then $a < b$.

Receivers of BPSK and QPSK signals commonly employ coherent detection as the most efficient method of recovering the binary data contained in these signals. These receivers include a local voltage-controlled oscillator (VCO) that generates a reference signal that is coherently combined with the input signal. The VCO is swept in frequency until the reference signal becomes locked in phase with the input signal. This phase locking is detected by a "lock detector" circuit. After phase lock, the lock detector generates a DC voltage that is greater than a threshold voltage, and deactivates the sweep signal to the VCO. Typically the lock detector combined with the local oscillator and control circuits form a phase locked loop (PLL).

Lock detector circuits for BPSK demodulators are known in the art. An example of such a circuit is described in U.S. Pat. No. 4,713,630 (Matthews), which discloses a PLL lock detector in a "Costas-type" demodulator circuit. Another example is shown in U.S. Pat. No. 4,860,321 (von der Embse), which describes a demodulator that uses baseband digital signal processing and determines lock conditions by means of certain digital algorithms.

A lock detector for a QPSK demodulator is described in U.S. Pat. No. 4,092,606 (Ryan), and comprises a PLL that drives a voltage controlled oscillator (VCO) coupled to the two data channels. This demodulator also includes a dithering circuit connected to the VCO that produces a tracking error of approximately 2 degrees in the phase locking. This error causes degradation of the BER. The Ryan circuit is suitable only for a balanced QPSK signal, i.e. for a ratio a/b near unity. The BER degradation is even larger if this circuit is used for UQPSK signals.

U.S. Pat. No. 4,870,382 (Keate et al.) also discloses a lock detector circuit for QPSK signals, in which absolute value detectors are used instead of analog multipliers to increase the speed of the detector. This scheme is advantageous only for signal-to-noise ratios that are large. Furthermore, this circuit is also suitable only for balanced QPSK signals.

In short, the previous demodulator lock detecting circuits have been designed and are useful only for QPSK signals that are balanced. No previous system is known for lock detection in demodulators of UQPSK signals.

SUMMARY OF THE INVENTION

The present invention provides a lock detector circuit (60) for demodulators of unbalanced QPSK signals that is useful for any value of a/b between zero (BPSK) and unity (balanced QPSK). The circuit is a combination of a BPSK lock detector and a QPSK lock detector of novel design having a dual output signal and an output signal switch (19), such that either output signal may be connected to the demodulator circuits controlling the VCO (42). The degree of imbalance determines which output signal is most advantageously used to control the VCO (42). True phase locking is indicated by a constant voltage over threshold at each output terminal (A), (B) of the detector; the unlocked condition produces oscillating voltages at these terminals. This circuit employs only three analog multipliers (3), (10), and (15), which reduces the bandwidth requirements and DC offset limitations of the circuit compared to previous circuits.

A method is also provided for generating lock detection signals from the inphase and quadriphase signals produced by the demodulator circuit. The signals are those produced at the two output terminals (A), (B) of the lock detector circuit disclosed herein. These signals are constant in time when the demodulator is in the locked condition, and oscillatory in the unlocked condition.

It is an object of this invention to provide a circuit for lock detection in demodulators of UQPSK signals, such that detection of the locked condition is provided for any degree of imbalance between the inphase and quadriphase channels.

A second object of this invention is to provide a circuit for lock detection in demodulators of UQPSK signals wherein the number of analog multipliers is no greater than three.

Another object of this invention is to provide a circuit for lock detection in demodulators of UQPSK signals that is not sensitive to false locks.

Yet another object of this invention is to provide a method for lock detection in demodulators of UQPSK signals, such that detection of the locked condition is provided for any degree of imbalance between the inphase and quadriphase channels.

These and other objects, advantages, characteristics and features of this invention may be better understood by examining the following drawings together with the detailed description of the preferred embodiment.

DETAILED DESCRIPTION OF THE PREFERRED EMBODIMENTS

Figure 1:
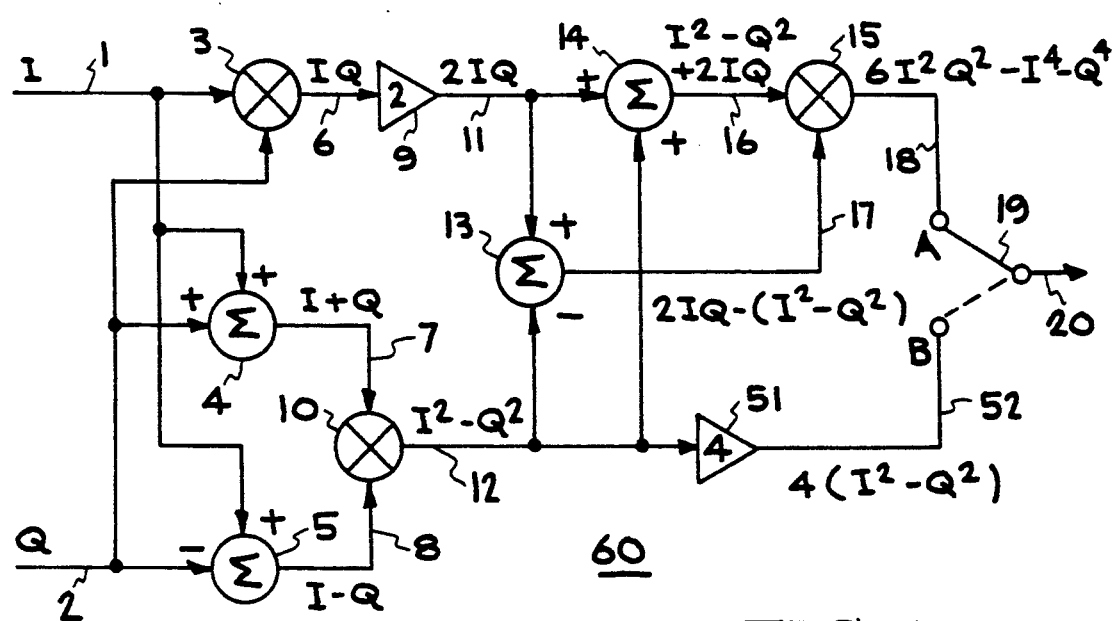
FIG. 1 shows a circuit diagram of a lock detector circuit according to the present invention.

FIG. 1 is a circuit diagram of the present lock detector, in which the inphase signal and quadriphase signal produced by the demodulator are used by the circuit to produce lock detection signals at the output terminals A and B. For purposes of illustration we assume that these signals are all voltage signals. Referring to FIG. 1, the input signal I on line 1 is fed to one input terminal of the multiplier circuit 3, one input to the summing circuit 4, and one input to the summing circuit 5. The other input signal Q on line 2 is fed to the other input terminal of multiplier 3, and the other inputs to summing circuits 4 and 5. The input of line 2 into summing circuit 5 is inverted, so that this circuit performs a subtraction of the signal on line 2 from the signal on line 1. Under locked conditions I and Q are normally the inphase and quadriphase signals sought to be recovered by the demodulation of the received signal. These designations are arbitrarily chosen for purposes of description, and could just as well be reversed.

The output of the multiplier circuit 3 is carried by line 6 to the input of the amplifier 9, which doubles the signal strength. Thus the output signal of amplifier 9 is 2IQ. This signal is carried by line 11 to one of the input terminals of summing circuit 13 and an input terminal of summing circuit 14.

The output of the summing circuit 4 is connected by line 7 to one input terminal of the multiplier circuit 10, and the output of summing (differencing) circuit 5 is connected by line 8 to the other input terminal of multiplier 10. The output of this multiplier 10 is connected through line 12 to the other input terminal of summing (differencing) circuit 13, the other input terminal of summing circuit 14, and the input terminal of the amplifier 51 which quadruples the signal strength. The output of amplifier 51 is connected to output terminal B by line 52. The signal carried by this line is $4(I^2 - Q^2)$.

The output of the summing (differencing) circuit 13 is connected by line 17 to one input terminal of the multiplier circuit 15. The output of the summing circuit 14 is connected to the other terminal of this multiplier 15 by line 16. The output terminal of the multiplier 15 is connected by line 18 to the output terminal A. Therefore the signal carried by this line 18 to terminal A is $6I^2Q^2 - I^4 - Q^4$.

An output terminal switch 19 is provided to allow either terminal A or terminal B to be connected to the output of the lock detector circuit on line 20. The choice between these output terminals depends on the degree of imbalance of the QPSK signal. If the signal is balanced, then I and Q are equal and the detector signal at terminal B is a null signal and switch 19 must be set to select terminal A, as shown in FIG. 1. On the other hand, for a pure BPSK signal where $Q=0$, theoretically either terminal could be utilized. In practice, it is found that under these conditions the A terminal produces a negative lock detection signal below threshold, and the switch 19 is therefore set to select the B terminal, as indicated by the dashed line in FIG. 1.

Figure 2:
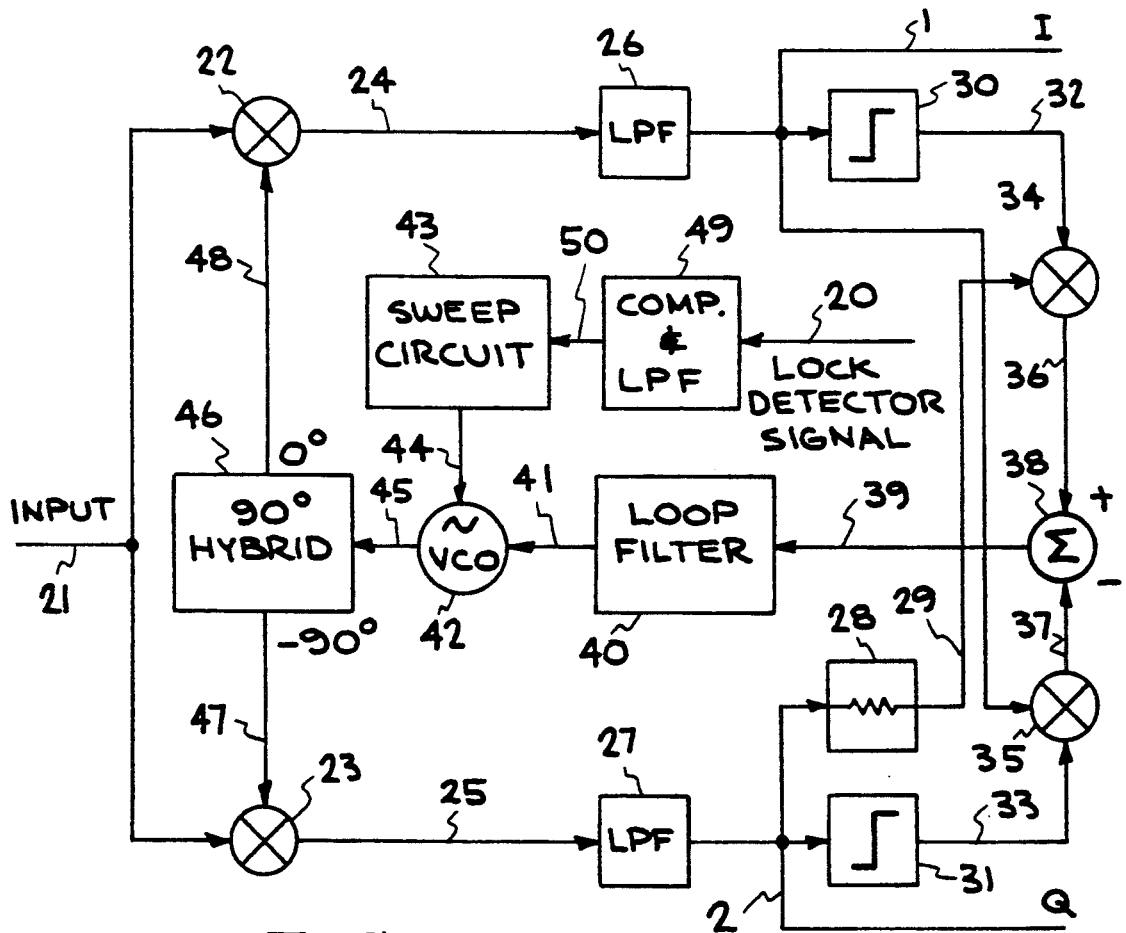
FIG. 2 is a circuit diagram of a Costas loop demodulator circuit for UQPSK signals to which the lock detector circuit may be connected to produce detection of the locked condition.

FIG. 2 shows a Costas loop demodulator circuit in which the lock detector circuit of FIG. 1 may be utilized. This circuit receives an input UQPSK signal on line 21, which is connected to one input terminal of multiplier 22 and an input terminal of multiplier 23. Reference signals are transmitted to the other input terminals of these multipliers 22, 23 through lines 48, 47 respectively.

The output terminal of multiplier 22 is connected by line 24 to the input terminal of low pass filter 26. The output terminal of this low pass filter 26 is connected to line 1, which carries the demodulator output signal I. The corresponding output terminal of multiplier 23 is connected by line 25 to the input terminal of low pass filter 27. The output terminal of this low pass filter 27 is connected to line 2, which carries the demodulator output signal Q. These lines 1, 2 provide the input signal channels for the lock detector circuit of FIG. 1, as described above.

Lines 1 and 2 are also connected to additional circuit elements in FIG. 2 to close the demodulator loop. Line 1 is connected to the input terminal of the hard limiter 30 and one input terminal of multiplier 35. Line 2 is connected to the input terminal of the hard limiter 31 and the input terminal of the attenuator 28. The output terminal of this attenuator 28 is connected through line 29 to the input terminal of the multiplier 34. This attenuator 28 is designed to account for the imbalance between the magnitude of the inphase and quadriphase signals, and could be located alternatively in the line 1 branch of this circuit. The output terminal of hard limiter 30 is connected by line 32 to the other input terminal of multiplier 34. Similarly, the output terminal of hard limiter 31 is connected by line 33 to the other input terminal of multiplier 35. The output terminal of multiplier 34 is connected by line 36 to one input terminal of the summing circuit 38, and the output terminal of multiplier 35 is connected by line 37 to the other input terminal of the summing circuit 38 with an inverter, so that the signal at the output terminal of the summing (differencing) circuit 38 is the difference between the signals on line 36 and line 37.

This difference signal is carried by line 39 from the output of multiplier 38 to the loop filter 40. The output terminal of this loop filter 40 is connected by line 41 to a first input terminal of the VCO 42. A second input terminal of the VCO 42 is connected by line 44 to the output terminal of the sweep circuit 43. This sweep circuit 43 is driven by the signal from the lock detector of FIG. 1 on line 20, which is connected to the input of the low-pass filter and threshold comparator 49. The output of this comparator circuit 49 is connected to the input of the sweep circuit 43 by line 50. When the demodulator is in the unlocked condition, the sweep circuit 43 sweeps the frequency of the VCO until the circuit reaches the locked state. At that point the locked state signal on line 20 becomes a DC voltage above threshold, which passes through the comparator 49 to line 50 and deactivates the sweep circuit 43, and the VCO 42 is controlled only by the feedback signal provided by line 41. The output terminal of the VCO 42 is connected by line 45 to the input terminal of a 90° hybrid 46, which divides the signal from line 45 into two components, and shifts the phase of one component by 90° relative to the other component. The output terminals of this hybrid 46 are connected to lines 47 and 48, and provide the reference signals to the multipliers 22, 23 described above, thus closing the demodulator loop.

When the foregoing demodulator is in the locked condition, the frequency of the VCO, $f_{VCO}$, is equal to the carrier frequency, $f_0$, and the voltage signals at the output terminals A, B, are constant. When the circuit is in the unlocked state, these output voltage signals oscillate at frequencies that are multiples of the beat frequency:

$$f_b = f_{VCO} - f_0. \quad (4)$$

The oscillation frequency at output terminal A is $4f_b$, and the frequency of oscillation at terminal B is $2f_b$. These oscillation signals are blocked by the comparator circuit 49, and the sweep circuit 43 sweeps the VCO frequency $f_{VCO}$ to achieve the locked state.

Figure 3:
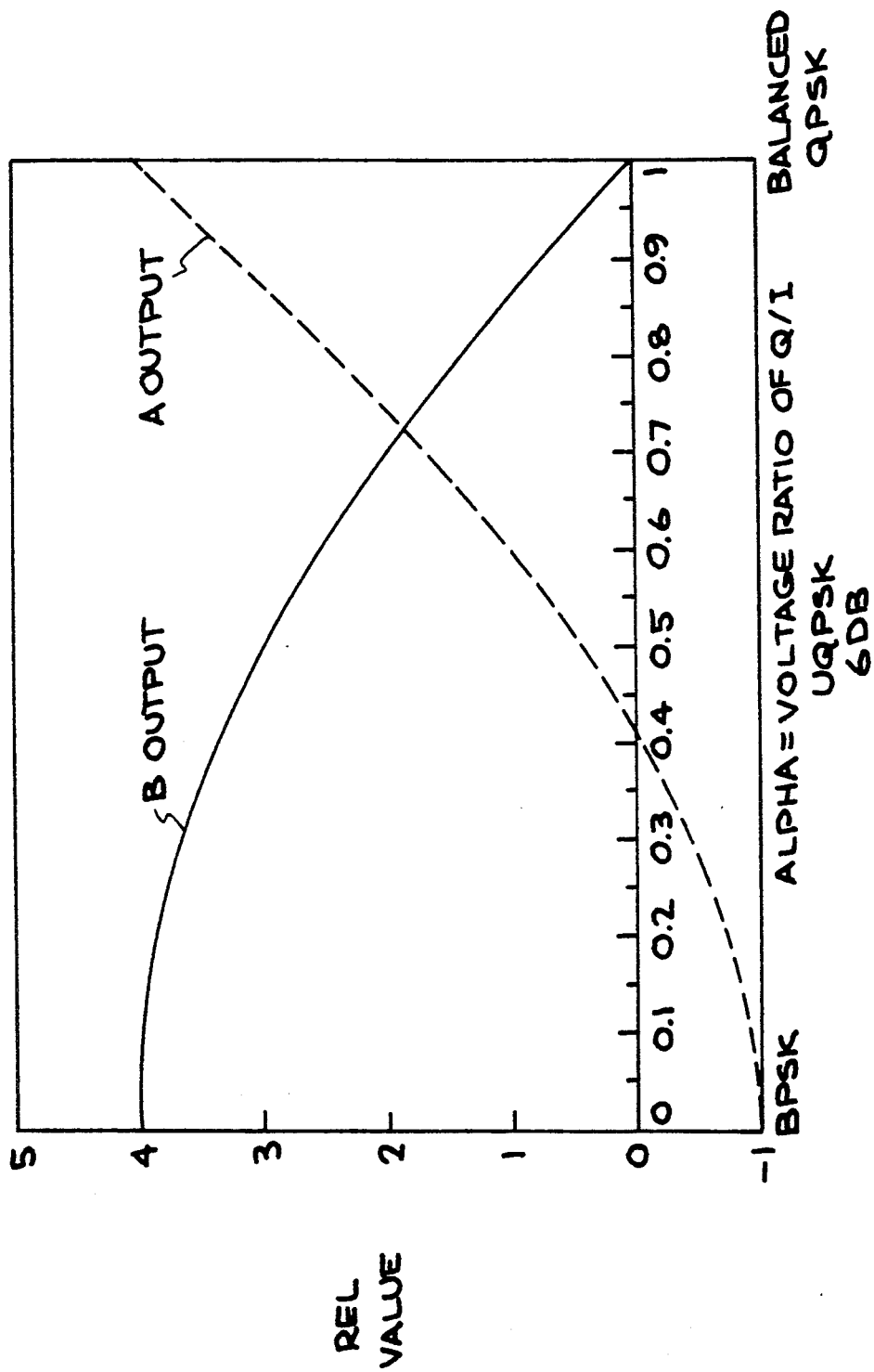
FIG. 3 is a graph of the relative value of the two output signals from the present lock detector circuit as a function of the imbalance between the inphase and quadriphase channels.

The amplitudes of the lock detector signals at terminals A and B depend on the amount of imbalance in the UQPSK input signal. FIG. 3 is a graph of the relative value of these signals as a function of the degree of imbalance given by the ratio a/b, namely the voltage ratio between the quadriphase and inphase signals. From this Figure it is apparent that when this voltage ratio decreases below approximately 0.7, the lock detector signal at the A terminal becomes less than the signal at the B terminal. For ratios of a/b below this value, the switch 19 is operated to connect the output signal line 20 to the B terminal. It will be seen from the Figure that an alternative embodiment of the invention can be obtained by replacing the switch 19 by a summing circuit, with the lines 52 and 18 connected to the input terminals and the output terminal connected to the line 20. In this case the detector output signal would be the sum of the signals labelled "A OUTPUT" and "B OUTPUT" in FIG. 3, and would be substantially constant over the entire range of a/b values.

The operation of the lock detector circuit may be summarized as a series of steps performed on the UQPSK demodulator output signals I and Q to produce a lock detector signal, as follows:

1 Form the signal $6I^2Q^2 - I^4 - Q^4$ at terminal A;
2 Form the signal $4(I^2 - Q^2)$ at terminal B;
3 If the ratio of signals Q/I is 0.7 or greater, detect the signal at terminal A; if the ratio is less than 0.7, detect the signal at terminal B.

In the alternative embodiment, the above step 3 is replaced by step 3′:

3′ Add the signal at terminal A to the signal at terminal B and detect the sum.

The formation of the signals at terminals A and B may be carried out in several ways. In the embodiment described here, these signals are formed as follows:

1a Multiply the signals $I \times Q \times 2$;
1b Add $I + Q$;
1c Add $I - Q$;
1d Multiply $4 \times (I+Q) \times (I-Q)$, to form the signal at terminal B;
1e Add $2IQ$ to $(I+Q)(I-Q)$;
1f Add $2IQ$ to $-(I+Q)(I-Q)$;
1g Multiply the products of steps 1e and 1f, to form the signal at terminal A.

Figure 4:
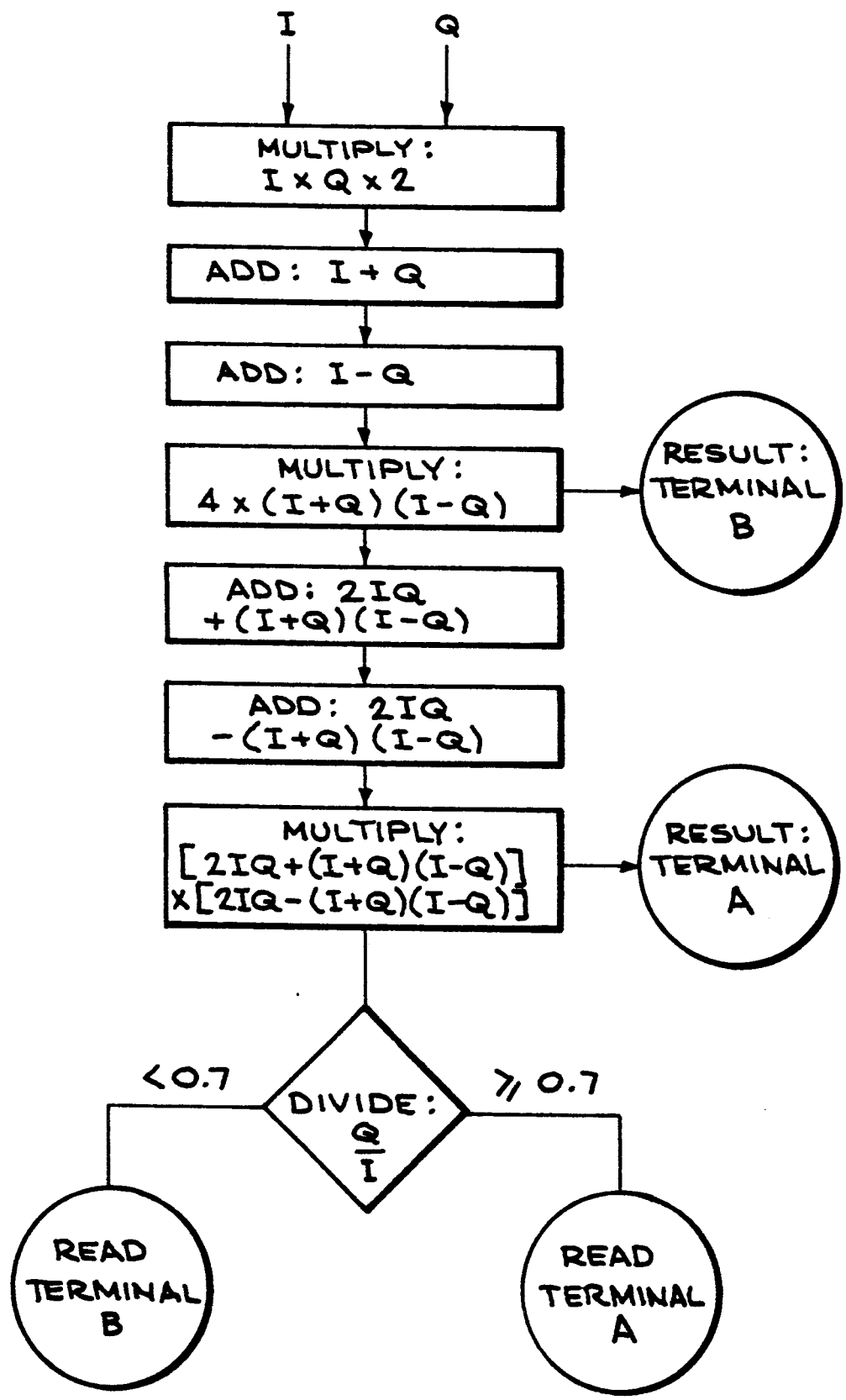
FIG. 4 is a flow chart illustrating the method for producing the output signals of the present lock detector circuit.

FIG. 4 is a schematic illustration of the above steps.

From the above description, it will be seen that the present lock detector circuit is substantially a combination of BPSK and QPSK lock detector circuits, wherein the QPSK circuit is of a new design. This circuit has the additional advantage in that only three analog multipliers are required. In previous QPSK lock detector circuits, such as the circuit described in Keate, supra, at least four such multipliers are required (or their equivalent). This reduction in the number of multipliers reduces the bandwidth requirements of the circuit and the sensitivity of the circuit to DC offsets. In addition, the present circuit is easier to construct and align than previous QPSK lock detector circuits.

The foregoing disclosure of the preferred embodiment of the invention has been presented for purposes of illustration and description. It is not intended to be exhaustive or to limit the invention to the precise form disclosed, and, obviously, many modifications and variations are possible in light of the above teaching. The embodiment was chosen and described in order to best explain the principles of the invention and its practical applications to thereby enable others skilled in the art to best utilize the invention in various embodiments and with various modifications as are suitable to the particular use contemplated. It is intended that the spirit and scope of the invention are to be defined by reference to the claims appended hereto.

What is claimed is:

1. A lock detector circuit for producing a lock detection signal from output signals I and Q generated by a demodulator of a UQPSK signal, said circuit comprising:

first signal processing means for receiving said signals I and Q to produce a signal A at a first terminal:

$$A = KI^2Q^2 - I^4 - Q^4,$$

where K is a constant value;
second signal processing means for receiving said signals I and Q to produce the signal B at a second terminal:

$$B = 4(I^2 - Q^2);$$

and a switch having a plurality of switching positions, said switch coupling the control circuits of said demodulator to said first terminal in a first switching position, and coupling the control circuits of said demodulator to said second terminal in a second switching position, whereby said control circuits are responsive to said signal A or signal B.

2. A lock detector circuit as recited in claim 1, wherein said constant value K is substantially equal to 6.

3. A lock detector circuit for producing a lock detection signal from output signals I and Q generated by a demodulator of a UQPSK signal, said circuit comprising:

first signal processing means for receiving said signals I and Q to produce a signal A at a first terminal:

$$A = KI^2Q^2 - I^4 - Q^4,$$

where K is a constant value;

second signal processing means for receiving said signals I and Q to produce the signal B at a second terminal:

$$B = 4(I^2 - Q^2);$$

and a summing circuit coupled to said first terminal and said second terminal for forming the sum of the signals at said first and second terminals, wherein said summing circuit has an output that is coupled to the control circuits of said demodulator, and said control circuits are responsive to said sum of signals.

4. A lock detector circuit as recited in claim 3, wherein said constant value K is substantially equal to 6.

5. A lock detector circuit as recited in claim 1, wherein said second signal processing means comprises:

first summing means for forming the sum $I+Q$;

second summing means for forming the sum $I-Q$;

and first multiplier means coupled to said first summing means and said second summing means for forming the product $$4((I+Q)(I-Q)) = B$$

and transmitting said product to said second terminal.

6. A lock detector circuit as recited in claim 5, wherein said first signal processing means comprises:

said second signal processing means;

second multiplier means for forming the product $2IQ$;

third summing means coupled to said second signal processing means and said first multiplier means for forming the sum $$2IQ - (I+Q)(I-Q);$$

fourth summing means coupled to said second signal processing means and said first multiplier means for forming the sum $$2IQ + (I+Q)(I-Q);$$

and third multiplier means coupled to said third summing means and said fourth summing means for forming the signal A and transmitting said signal to said first terminal.

7. A method for producing a lock detector signal from the output signals I and Q generated by a demodulator of a UQPSK signal, said method comprising the steps of:

forming a signal $6I^2Q^2 - I^4 - Q^4$ at a terminal A;

forming a signal $4(I^2 - Q^2)$ at a terminal B; determining the ratio of the signals Q/I; and if said ratio is greater than or equal to 0.7, detecting the signal at terminal A; and, if said ratio is less than 0.7, detecting the signal at terminal B.

8. A method for producing a lock detector signal from the output signals I and Q generated by a demodulator of a UQPSK signal, said method comprising the steps of:

forming a signal $6I^2Q^2 - I^4 - Q^4$ at a terminal A;

forming a signal $4(I^2 - Q^2)$ at a terminal B; and forming the sum of said signals at terminal A and terminal B to produce said lock detector signal.

9. A method for producing a lock detector signal as recited in claim 7, wherein said step of forming said signal at a terminal A comprises the substeps of:

forming the signal at terminal B as recited in claim 7;

forming a first product signal $2IQ$;

forming a first sum signal by adding said first product signal and one-fourth of said signal at terminal B;

forming a second sum signal by subtracting one-fourth of said signal at terminal B from said first product signal; and forming a third product signal by multiplying said first sum signal and said second sum signal, and transmitting said third product signal to said terminal A.

* * * * *